United States Patent [19]

Muto

[11] Patent Number: 4,484,237
[45] Date of Patent: Nov. 20, 1984

[54] APPARATUS FOR AUTOMATICALLY SETTING THE OPTIMUM PERFORMANCE CHARACTERISTICS OF A TAPE RECORDER

[75] Inventor: Kenji Muto, Hamamatsu, Japan

[73] Assignee: Nippon Gakki Seizo Kabushiki Kaisha, Hamamatsu, Japan

[21] Appl. No.: 336,763

[22] Filed: Jan. 4, 1982

[30] Foreign Application Priority Data

Jan. 14, 1981 [JP] Japan ................................. 56-4284
Jan. 14, 1981 [JP] Japan ................................. 56-4285
Jan. 14, 1981 [JP] Japan ................................. 56-4286

[51] Int. Cl.$^3$ ........................ G11B 15/02; G11B 5/45
[52] U.S. Cl. ..................................... 360/25; 360/65; 360/68
[58] Field of Search ..................... 360/65, 66, 67, 68, 360/31, 25

[56] References Cited

U.S. PATENT DOCUMENTS

| | | | |
|---|---|---|---|
| 4,258,397 | 3/1981 | Kitamura et al. | 360/25 |
| 4,262,313 | 4/1981 | Mouri | 360/25 |
| 4,279,005 | 7/1981 | Kitamura et al. | 360/31 |
| 4,405,953 | 9/1983 | Inomara et al. | 360/68 |

Primary Examiner—Vincent P. Canney
Attorney, Agent, or Firm—Oblon, Fisher, Spivak, McClelland & Maier

[57] ABSTRACT

An apparatus using microcomputing system for automatically setting the optimum performance characteristics of a magnetic tape used. When the type of a magnetic tape loaded into a tape recorder is detected, the microcomputing system sets the standard recording level and the standard recording bias level of the magnetic tape in a recording level setting circuit and a bias level setting circuit of the tape recorder, respectively. When an automatic setting instruction and a subsequent recording start instruction are issued, a test signal having a certain frequency range is recorded on the magnetic tape and reproduced therefrom. The reproduced test signal is then supplied to a level deviation detecting circuit which detects the level deviation between the test signal of a predetermined frequency and the reproduced test signal of the same frequency and the level deviation between components of the reproduced test signal which are of different frequency. The microcomputing system corrects the standard recording level and the standard bias level to the optimum recording level and to the optimum bias level on the basis of the detected level deviations, respectively. An erase head to erase the test signal recorded is disposed at a position downstream of a playback head in the running direction of the magnetic tape, and the normal recording is started immediately after completing the automatic setting without rewinding the magnetic tape.

7 Claims, 5 Drawing Figures

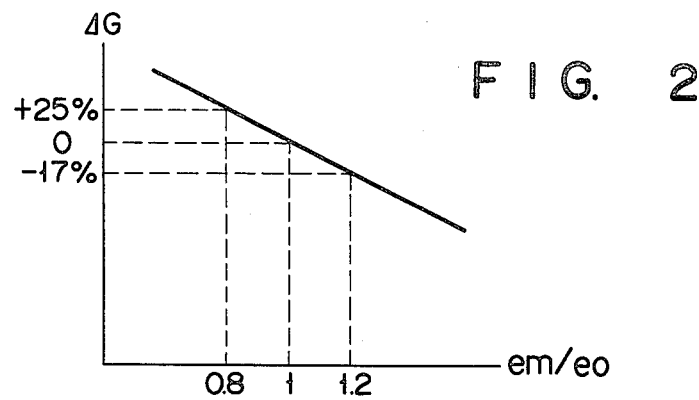
FIG. 2
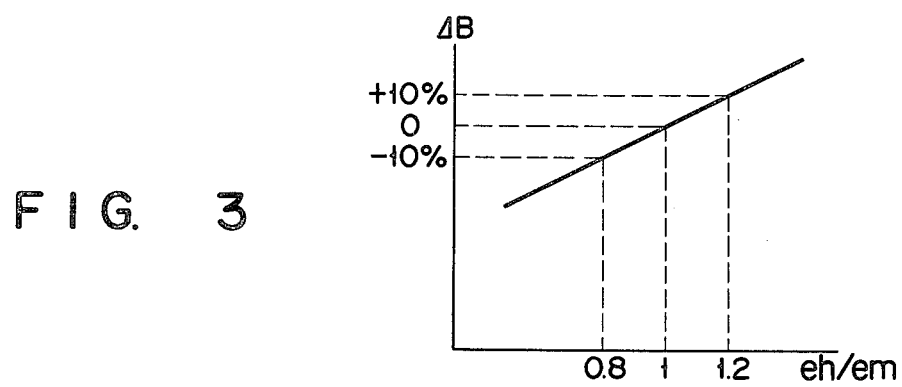
FIG. 3
FIG. 4
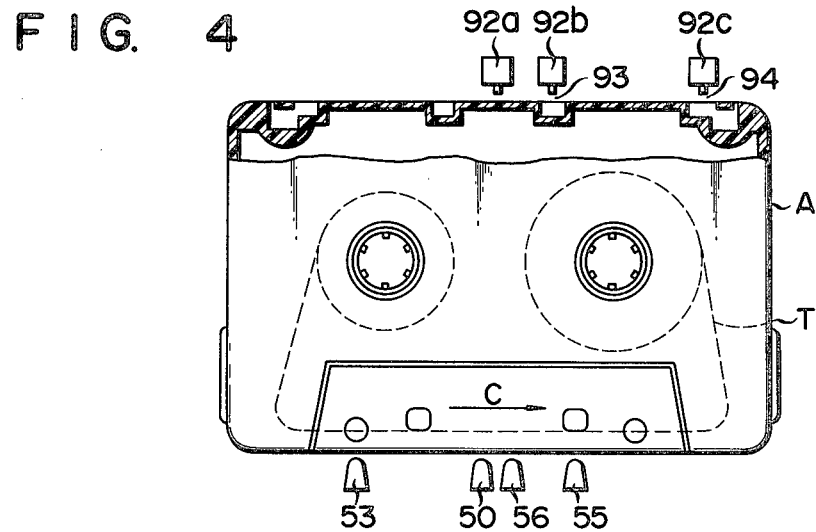

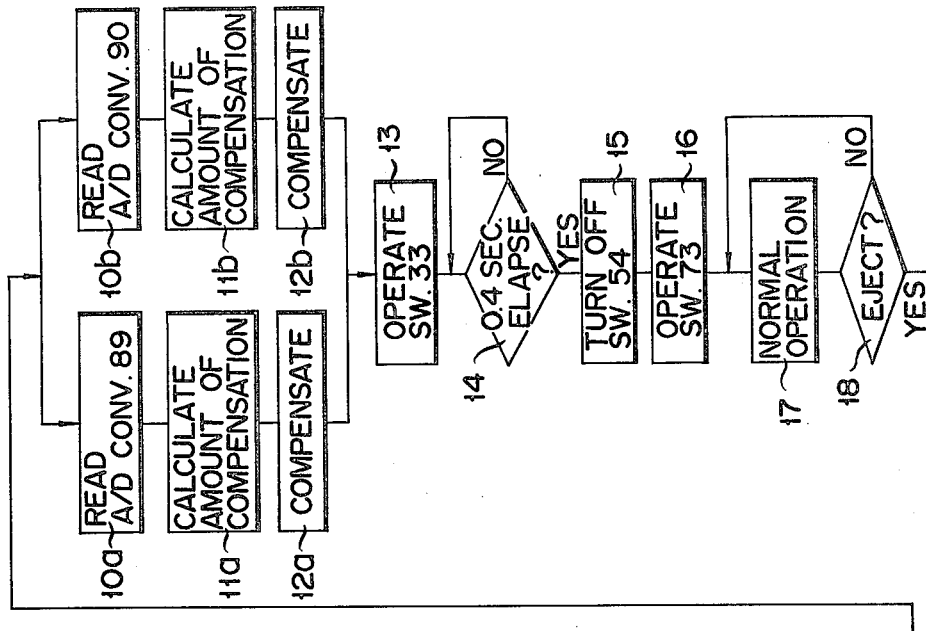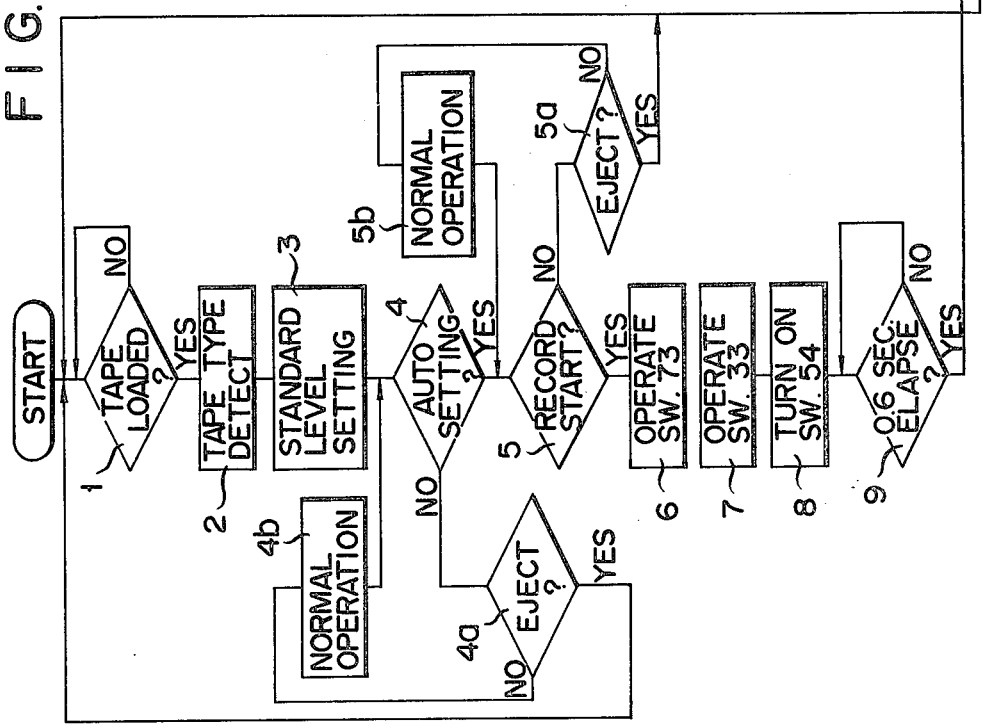
F I G. 5

APPARATUS FOR AUTOMATICALLY SETTING THE OPTIMUM PERFORMANCE CHARACTERISTICS OF A TAPE RECORDER

BACKGROUND OF THE INVENTION

The present invention relates to a tape recorder, and more particularly to an apparatus for setting automatically the optimum performance characteristics for recording and reproduction in accordance with the magnetic property of magnetic tape to be used.

In the recent years, various magnetic tapes having excellent magnetic properties are commericaly available. The magnetic tapes are selectively used according to the types of recording signals. To make full use of the performances of these mangetic tapes ($\gamma$-ferric oxide, chromium-dioxide, ferrichrome, metal, and so on) they must be used in the optimum recording condition according to the types thereof and more strictly according to magnetic properties of the individual tapes even though they are of the same type. In order to satisfy such optimum recording condition, it is necessary to set the optimum performance characteristics such as the optimum recording level, the optimum recording bias level, the optimum recording equalization, and so on in recording circuits in accordance with the magnetic property of magnetic tapes.

In the conventional methods of setting the optimum performance characteristics generally a test signal is recorded on a magnetic tape while changing its recording level or recording bias level successively, and the recording level or bias level at which the reproduced signal level reaches a predetermined value or the maximum value is detected. The optimum performance characteristics are set according to the detected result. See, for example, Japanese patent preliminary publication Nos. Sho 55-17837 and 55-52510. In this kind of method, however, setting the optimum performance characteristics usually requires a long time of 20 to 40 seconds, and since the magnetic tape is running during this setting time the magnetic tape must be rewound after completing the setting in order to start the normal recording. In result, there has been occured the troublesomeness of manipulation of the tape recorder.

SUMMARY OF THE INVENTION

It is an object of the present invention to provide a tape recorder capable of setting the recording level and/or the recording bias level to the optimum performance level within a short period.

It is a further object of the invention to provide a tape recorder in which such a setting can be lightly done without embarrassment and trouble.

A tape recorder of the present invention automatically sets the recording level and/or the recording bias level to the optimum level using a microcomputing system comprising a central processor unit (CPU), a read-only memory (ROM), and a random access memory (RAM).

The microcomputing system sets the recording level and/or recording bias level of a recording level setting circuit and/or a recording bias level setting circuit to the standard level of the type of a magnetic tape ($\gamma$-ferric oxide, chronium-dioxide, ferrichrome, metal, etc.) being used. When both an automatic optimum performance setting instruction and a recording start instruction are issued, a test signal having a constant amplitude level over a certain range of frequency is recorded on the magnetic tape and then reproduced therefrom. The reproduced test signal is supplied to a level deviation detecting circuit. The level deviation detecting circuit detects both the level deviation between the test signal of a predetermined frequency and the reproduced test signal of the same frequency and the level deviation between reproduced components of the test signal of different frequency. The microcomputing system then corrects the standard recording level and/or the standard recording bias level to the optimum level.

An erase head to erase the test signal recorded on the magnetic tape during automatic setting of the optimum performance level is disposed at a position downstream of a playback head in the running direction of magnetic tape, whereby the normal recording can be started without rewinding the magnetic tape immediately after the automatic setting of the optimum performance is completed. In the present invention a time taken for automatic setting of the optimum performance characteristics is one to two seconds.

BRIEF DESCRIPTION OF THE DRAWINGS

FIG. 2 shows the relationship between the level deviation and the amount of compensation of the recording level;

FIG. 3 shows the relationship between the level deviation and the amount of compensation the recording bias level;

FIG. 4 shows an arrangement of a tape-loading detect switch, hole detect switches, and record, playback, and erase heads;

FIG. 5 is a flow chart for explaining the operation of the apparatus of the present invention.

DETAILED DESCRIPTION OF THE PREFERRED EMBODIMENT

Figure 1:
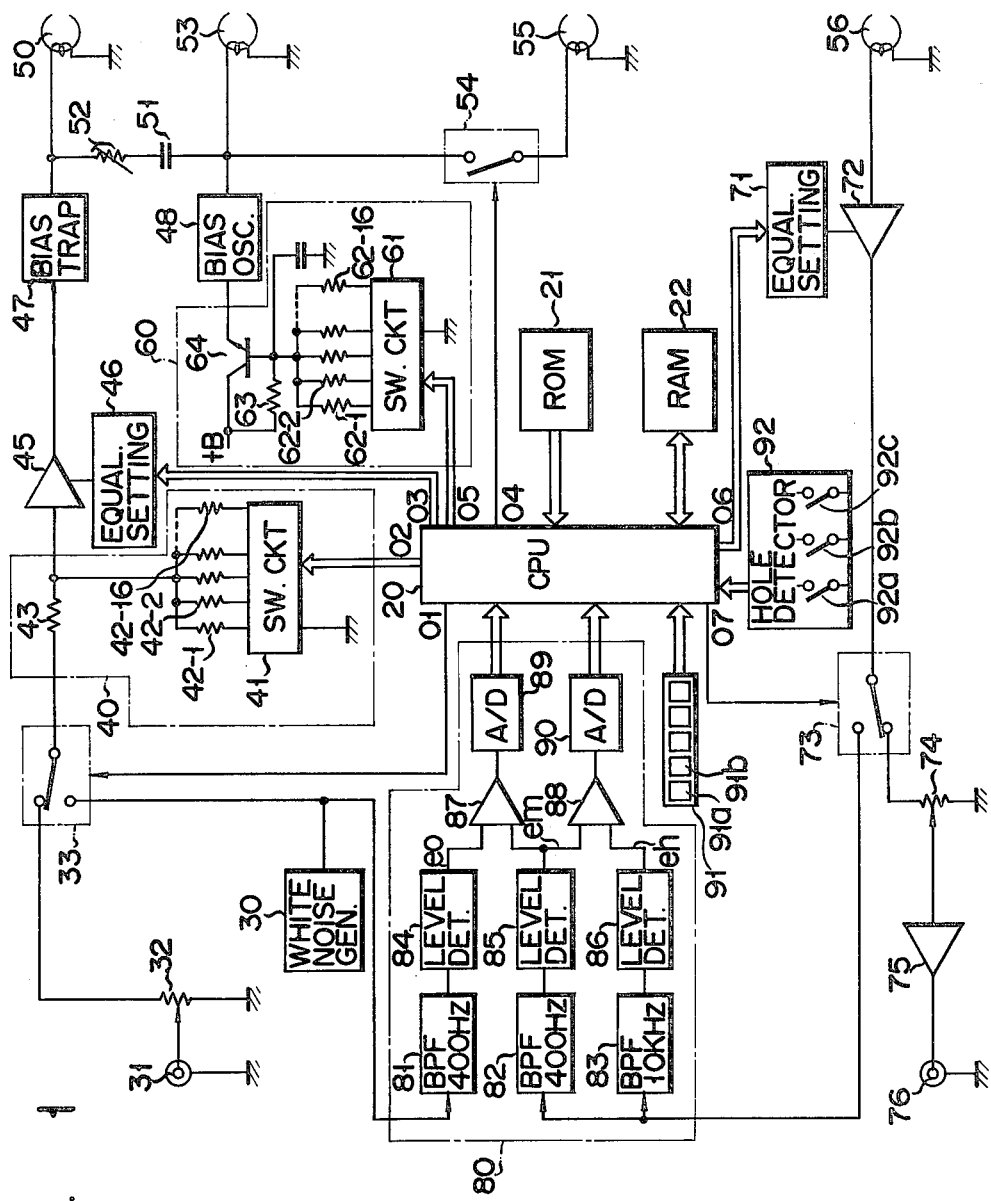
FIG. 1 shows apparatus for automatically setting the optimum performance characteristics of a tape recorder embodying the present invention.

FIG. 1 shows an arrangement of a three-head cassette deck to which the present invention is applied. In FIG. 1, reference numeral 20 represents a central processing unit (CPU) such as a microprocessor, which is arranged to carry out various controls to be described later according to programs stored in a read-only memory (ROM) 21 while using a random access memory (RAM) 22. Reference numeral 30 denotes a white noise generator acting as a test signal source which generates a noise signal (white noise) as a test signal having a flat amplitude level over a range from a low frequency (around 400 Hz) to a high frequency (around 14 kHz). Reference numerals 31, 32, and 33 represent an input terminal for receiving a normal recording signal, a variable resistor and a changeover switch, respectively. The changeover switch 33 is controlled by an output $O_1$ of CPU 20 to select either the normal recording signal supplied via input terminal 31 and variable resistor 32 or the test signal from white noise generator 30. Reference numeral 40 denotes a recording level setting circuit to attenuate either one of the recording signal and test signal selected by changeover switch 33. An output signal of recording level setting circuit 40 is applied to a recording amplifier 45. The recording level setting circuit 40 comprises a switching circuit 41 controlled by an output $O_2$ (4 bits) of CPU 20, resistors 42-1 to 42-16 one of which is selectively grounded by switching circuit 41, and a resistor 43, which constitute a 16-step variable attenuation circuit. The recording amplifier 45 is arranged such that its frequency characteristic can be varied by a recording equalizer circuit 46 whose resonance frequency is selected by an output $O_3$ of CPU 20. After passing through a bias trap circuit 47 an output signal of recording amplifier 45 is superposed with recording bias current supplied from a bias oscillator 48 and then supplied to a recording head 50. The bias oscillator 48 is arranged such that the output thereof, the recording bias current level can be controlled by a voltage supplied from a bias level setting circuit 60. The bias current generated by bias oscillator 48 is supplied to recording head 50 via capacitor 51 and variable resistor 52, to a first erase head 53 (an ordinary erase head), and also to a second erase head 55 (for erasing the recorded test signal) via a switch 54 controlled by an output $O_4$ of CPU 20. The recording bias setting circuit 60 is a variable voltage source comprising a switching circuit 61 controlled by output $O_5$ (4 bits) of CPU 20, resistors 62-1 to 62-16 one of which is selectively grounded by switching circuit 61, a resistor 63, and an NPN transistor 64 whose base current is determined by resistor 63 and grounded one of resistors 62-1 to 62-16, and changes a voltage to be supplied to bias oscillator 48 according to the output $O_5$ of CPU 20.

Next, reference numerals 56, 71, and 72 represent a playback head, a reproducing equalizer circuit whose time constant is selected by an output $O_6$ of CPU 20, and a reproducing amplifier whose frequency characteristics is varied by reproducing equalizer circuit 71, respectively. A signal reproduced by playback head 56 is amplified by reproducing amplifier 72 and is supplied to a changeover switch 73. This changeover switch 73 is controlled by an output $O_7$ of CPU 20 to apply an output signal of reproducing amplifier 72 to a variable resistor 74 during normal recording and playback, and to a level deviation detecting circuit 80 during the setting of optimum performance characteristics. Reference numeral 75 represents a line amplifier and reference numeral 76 an output terminal for the normal reproduced signal.

Further the deviation detecting circuit 80 detects the level deviation between two reproduced test signal components of different predetermined frequencies and the level deviation between a reproduced test signal and a reference signal which are of a predetermined frequency. In the circuit 80, reference numerals 81 and 82, represent bandpass filters (BPF) which allow to pass a signal of a band in the neighborhood of 400 Hz, and reference numeral 83 a bandpass filter to pass a signal of a band in the neighborhood of 10 kHz. A test signal (the reference signal in this case) is supplied to BPF 81 from white noise generator 30 and the reproduced test signal is supplied to BPFs 82 and 83 via changeover switch 73. Reference numerals 84, 85, and 86 represent level detectors which act to convert the levels of output signals of BPFs 81, 82, and 83 into corresponding DC levels, respectively (let them be eo, em, and eh, respectively). Reference numeral 87 represents a differential amplifier that produces a voltage signal corresponding to the deviation (eo-em) between the output DC levels eo and em of level detectors 84 and 85, and reference numeral 88 a differential amplifier that produces a voltage signal corresponding to the deviation (em-eh) between the output DC levels em and eh of level detectors 85 and 86. Reference numerals 89 and 90 are A/D converters which act to convert the output voltage signals of differential amplifiers 87 and 88 into digital signals which are applied to CPU 20.

Furthermore, the ROM 21 stores a value corresponding to the dc level eo (; this dc level eo is a standard level and always has a constant value), the relationship between the deviation (eo-em) and amount of compensation (let it be ΔG) of the recording level which is necessary to make the present recording level agree with the optimum recording level, and the relationship between the deviation (em-eh) and amount of compensation (let it be ΔB) of the recording bias level which is necessary to make the present recording bias level agree with the optimum recording bias level. FIG. 2 is a characteristic diagram indicating the relationship between the value em/eo calculated from the DC level eo and the deviation (eo-em) and the compensation amount ΔG of the recording level, and FIG. 3 a characteristic diagram indicating the relationship between the value eh/em calculated from the DC level eo, deviation (eo-em), and deviation (em-eh) and the compensation amount ΔB of recording bias level. These relationship are stored in ROM 21 in the form of data table. In addition, in ROM 21 information necessary to set standard performance characteristics for various types of magnetic tapes is also stored.

Now, returning to FIG. 1, reference numeral 91 denotes an operational section which comprises an automatic setting specifying switch (push button switch) 91a for setting the optimum performance characteristics automatically, and a recording start switch (push button switch) 91b. The outputs of operational section 91 or output signals of automatic setting specifying switch 91a and recording start switch 91b are applied to CPU 20. Reference numeral 92 is a cassette detecting circuit comprising a tape loading detection switch 92a for detecting that a magnetic tape has been loaded on the tape recorder and hole detection switches 92b and 92c for detecting a sensing hole prepared in a case (cassette) of the magnetic tape in accordance with the type of tape. Outputs of this detecting circuit 92 or output signals of tape loading detection switch 92a and hole detection switches 92b and 92c are supplied to CPU 20.

Moreover, in the above structure, tape loading detection switch 92a constitutes tape loading detection means and CPU 20, ROM 21, RAM 22, recording level setting circuit 40, recording bias level setting circuit 60, and hole detection switches 92b and 92c together constitute standard performance characteristics setting means. CPU 20, ROM 21, RAM 22, recording level setting circuit 40, and recording bias level setting circuit 60 together constitute performance characteristics compensation means.

FIG. 4 is an elevational view showing an arrangement of the aforementioned recording head 50, erase heads 53 and 55, playback head 56, tape loading detection switch 92a, and hole detection switches 92b and 92c. In FIG. 4 reference characters A, T, and arrow C represent a cassette, a magnetic tape, and the running direction of magnetic tape T in recording and playback operations, respectively. Erase head 53 (an ordinary erase head), recording head 50, and playback head 56 are arranged as in ordinary 3-head tape recorders. The erase head 55 is provided for erasing the recorded test signal and placed downstream of playback head 56 in the running direction of magnetic tape T in recording and playback operation. Tape loading detection switch 92a is arranged to operate when cassette A is loaded. Hole detection switches 92b and 92c are arranged to operate in response to sensing hole 93 (metal hole) and 94 (chromium hole) prepared in metal tape and chromium tape cassettes, respectively.

The operation of the apparatus of the present invention as described above will be described hereinafter referring to FIG. 5 which shows a flow chart of the operation of this embodiment. First of all, when a magnetic tape is loaded on the tape recorder, tape loading detection switch 92a of detecting circuit 92 is operated by cassette A. By reading the state of tape loading detection switch 92a, CPU 20 detects that the magnetic tape has been loaded (step 1), and starts the following sequence of operations. In step 2, CPU 20 reads the states of hole detection switches 92b and 92c to identify the type of the loaded magnetic tape (normal tape, chromium tape, or metal tape). The CPU 20 sets the standard performance characteristics of the loaded tape by providing recording level setting circuit 40, recording equalization setting circuit 46, recording bias level setting circuit 60, and reproducing equalization circuit 71 with the corresponding information stored in advance in ROM 21 (step 3). Next, CPU 20 reads the state of automatic setting specifying switch 91a in the operational section 91 to determine whether the automatic setting is specified (step 4). Then, if the automatic setting is specified, CPU 20 reads the state of the recording start switch 91b to determine whether the recording start is specified (step 5). If the sound recording start is specified (at this time the loaded magnetic tape starts running), the changeover switch 73 is switched to deviation detecting circuit 80 to start the aforementioned deviation detection (step 6), changeover switch 33 is switched to white noise generator 30 to start recording of the test signal (step 7), and then switch 54 is turned on to enable erase head 55 (step 8). Then, CPU 20 waits for approximately 0.6 second considering the time by which a position on the magnetic tape which was right at the position of erase head 53 at the start of recording reaches the position of playback head 56 (step 9).

When 0.6 second elapses, CPU 20 executes the following two processes in parallel. As the first process, CPU 20 reads the deviation (eo-em) outputted from A/D converter 89 (step 10a), calculates the value of em/eo from the deviation (eo-em) and the stored standard level eo, and derives the compensation amount ΔG for the recording level from the value em/eo (step 11a). CPU 20 then obtains the optimum recording level (which is stored in RAM 22) from the compensation value ΔG and the stored standard recording level eo and issues a signal corresponding to the optimum sound recording level to the recording level setting circuit 40 to compensate the preset standard recording level to the optimum recording level (step 12a). Next, as the second process, CPU 20 reads the deviation (em-eh) outputted from A/D converter 90 (step 10b), calculates the value of eh/em from the deviations (em-eh) and (eo-em), and the standard level eo, and derives the correction amount ΔB for the recording bias level from the value of eh/em (step 11b). From this compensation amount ΔB and the standard recording bias level is derived the optimum recording bias level (which is stored in RAM 22). A signal corresponding to the optimum recording bias level is outputted to recording bias level setting circuit 60 to correct the standard recording bias level to the optimum recording bias level (step 12b).

Next, CPU 20 switches changeover switch 33 to variable resistor 32 (on the side of usual recording signal) to enable the normal recording signal to be recorded (step 13). Then CPU 20 waits for approximately 0.4 second considering the tape running time taken while a position of the loaded magnetic opposite to recording head 50 reaches erase head 55 (step 14). When 0.4 second elapses, the switch 54 is turned off to disable erase head 55 (step 15), and changeover switch 73 is switched to variable resistor 74 so that the normal reproduced signal may be taken from the output terminal 76 (step 16). When automatic setting of the optimum performance characteristics is thus completed, the test signal recorded during the automatic setting operation (an extremely short time) has been erased by erase head 55 so that the normal recording is made possible without rewinding the magnetic tape.

Further, the normal recording and reproducing operations including the recording carried out immediately after the automatic setting of the optimum performance characteristics are carried out under the same optimum performance characteristics until the loaded magnetic tape is ejected (the loop consisting of steps 17 and 18). In the aforementioned step 4, if the automatic setting of the optimum performance characteristics is not specified, the loaded magnetic tape is used under the standard performance characteristics until the loaded magnetic tape is ejected (the loop consisting of step 4, step 4a and step 4b). When the automatic setting is specified in step 4 and then a playback start instruction is first given instead of a recording start instruction, the automatic setting of the optimum performance characteristics for the magnetic tape is carried out by a first recording start instruction which is given by a time when the loaded magnetic tape is ejected, due to the loop of steps 5, 5a and 5b.

What is claimed is:

1. A tape recorder comprising:
a recording head and a playback head;
a recording level setting circuit for setting a level of an input signal to be supplied to said recording head for recording the input signal on a magnetic tape;
a test signal source, which is to be connected to said recording level setting circuit during an automatic setting of optimum performance characteristics in the tape recorder, to produce a test signal over a certain range of frequency;
deviation detecting means, which is to be connected to said playback head during the automatic setting of the optimum performance characteristics, for detecting a level deviation between the test signal of a predetermined first frequency produced by said test signal source and the test singal of said predetermined first frequency reproduced from the magnetic tape by said playback head;
automatic setting instruction means including a recording instruction manipulating means for operating the automatic setting of the optimum performance characteristics upon its manipulation;
standard level setting means for setting a certain standard recording level in said recording level setting circuit;
an erase head placed downstream of said playback head in the tape running direction for erasing the test signal recorded on the magnetic tape during the automatic setting of the optimum performance characteristics in the tape recorder; and
means for performing the automatic setting of the optimum performance characteristics comprising:

connection means responsive to the operation of said automatic setting instruction means, for connecting said test signal source to said recording level setting circuit and for connecting said playback head to said deviation detecting means; and signal operation correction means including a calculation means for calculating a level setting correction amount based upon said level deviation of said deviation detecting means and further including a storage means for storing said level setting correction amount, wherein said signal operation correcting means provides a single output for correcting said standard recording level set in said recording level setting circuit to the optimum recording level of said magnetic tape wherein said automatic setting performing means further comprises a means responsive to the output of said correction means for disconnecting said test signal from and connecting the input signal normally to be recorded to said recording level setting circuit.

2. A tape recorder comprising:

a recording head and a playback head;

a bias oscillator to supply said recording head with a bias current;

a recording bias level setting circuit for setting a level of the bias current to be supplied to said recording head;

a test signal source, which is to be connected to said recording head during an automatic settting of the optimum performance characteristics in the tape recorder, to produce a test signal over a certain range of frequency;

deviation detecting means, which is to be connected to said playback head during the automatic setting of the optimum performance characteristics, for detecting a level deviation of the test signal at first and second frequencies which is produced from a magnetic tape by said playback head;

automatic setting instruction means including a recording instruction manipulating means for operating the automatic setting of the optimum performance characteristics upon its manipulation;

standard level setting means for setting a certain standard recording bias level in said recording bias level setting circuit;

an erase head placed downstream of said playback head in the tape running direction for erasing the test signal recorded on the magnetic tape during the automatic setting of the optimum performance characteristics in the tape recorder; and means for performing the automatic setting of the optimum performance characteristics comprising:

connection means responsive to the operation of said automatic setting instruction means, for connecting said test signal source to said recording head and said playback head to said deviation detecting means; and signal operation correction means including a calculation means for calculating a level setting correction amount based upon said level deviation of said deviation detecting means and further including a storage means for storing said level setting correction amount, wherein said signal operation correcting means provides a single output for correcting said standard recording bias level set in said recording bias level setting circuit to the optimum recording bias level of said magnetic tape wherein said automatic setting performing means further comprises a means responsive to the output of said correction means for disconnecting said test signal from and connecting the input signal normally to be recorded to said recording level setting circuit.

3. A tape recorder comprising:

a recording head and a playback head;

a recording level setting circuit for setting a level of an input signal to be supplied to said recording head for recording the input signal on a magnetic tape;

a bias oscillator to supply said recording head with a bias current;

a recording bias level setting circuit for setting a level of the bias current to be supplied to said recording head;

a test signal source, which is to be connected to said recording level setting circuit during an automatic setting of optimum performance characteristics in the tape recorder, to produce a test signal over a certain range of frequency;

deviation detecting means to be connected to said playback head during the automatic setting of the optimum performance characteristics for detecting a level deviation between the test signal of a first predetermined frequency produced by said test signal source and the test signal of the first predetermined frequency reproduced from the magnetic tape by said playback head and detecting a level deviation of the test signal of different predetermined frequencies reproduced by said playback head;

automatic setting instruction means including a recording instruction manipulating means for operating the automatic setting of the optimum performance characteristics upon its manipulation;

standard level setting means for setting a certain standard recording level and a certain standard recording bias level in said recording level setting circuit and in said recording bias level setting circuit, respectively;

an erase head placed downstream of said playback head in the tape running direction for erasing the test signal recorded on the magnetic tape during the automatic setting of the optimum performance characteristics in the tape recorder; and means for performing the automatic setting of the optimum performance characteristics comprising:

connection means responsive to the operation of said automatic setting instruction means for connecting said test signal to said recording level setting circuit and for connecting said playback head to said deviation detecting means; and signal operation correction means including a calculation means for calculating a level setting correction amount based upon said level deviation of said deviation detecting means and further including a storage means for storing said level setting correction amount, wherein said signal operation correcting means provides a single output for correcting said standard recording level and said standard recording bias level set in said recording level setting circuit and said recording bias level setting circuit to the optimum recording level and the optimum recording bias level of the magnetic tape wherein said automatic setting performing means further comprises a means responsive to the output of said correction means for disconnecting said test signal from and connecting the input signal normally to be recorded to said recording level setting circuit.

4. A tape recorder according to claim 1, 2, or 3, further comprising:

tape loading detection means for detecting whether the magnetic tape is loaded into the tape recorder or not, wherein said automatic setting performing means are enabled only when said automatic setting instruction means is firstly operated after said tape loading detection means detects that the magnetic tape is loaded into the tape recorder.

5. A tape recorder according to claim 1, 2, or 3, further comprising:

tape type detecting means for detecting the type of the magnetic tape loaded into the tape recorder; and standard level memory means having a plurality of standard level data of various tape types; wherein said standard level setting means is controlled based on the standard level data derived from said standard level memory means resulting from the detection of said tape type detecting means.

6. A tape recorder according to claim 4, wherein the magnetic tape is a cassette tape.

7. A tape recorder according to claim 1, 2, or 3, wherein said test signal source is a white noise generator.

* * * * *